United States Patent
Roy et al.

(10) Patent No.: US 7,406,466 B2
(45) Date of Patent: Jul. 29, 2008

(54) REPUTATION BASED SEARCH

(75) Inventors: H. Scott Roy, Palo Alto, CA (US);
Timothy M. Nufire, San Francisco, CA (US); Esteban Kozak, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 386 days.

(21) Appl. No.: 11/036,604

(22) Filed: Jan. 14, 2005

(65) Prior Publication Data

US 2006/0161524 A1      Jul. 20, 2006

(51) Int. Cl.
G06F 7/00 (2006.01)
G06F 17/30 (2006.01)
(52) U.S. Cl. .......................................... 707/3
(58) Field of Classification Search ............. 707/1, 707/2, 3, 5
See application file for complete search history.

(56) References Cited

U.S. PATENT DOCUMENTS 6,314,420 B1    11/2001  Lang et al.
2002/0198866 A1*  12/2002  Kraft et al. ............... 707/3
2006/0026147 A1*  2/2006  Cone et al. ............... 707/3

OTHER PUBLICATIONS

Zacharia et al., "Trust Management Through reputation Mechanisms", Workshop in Deception, Fraud, and Trust Agent Societies, Third International Conference on Autonomous Agents, May 1999; ACM.*
Jumppanen, "File Reputation in Decentralized P2P reputation Management", HUT T-110.551 Seminar on Interworking, 2005.*

* cited by examiner

*Primary Examiner*—Christian Chace
*Assistant Examiner*—Michael J Hicks
(74) *Attorney, Agent, or Firm*—Dreier LLP; Seth H. Ostrow

(57) ABSTRACT

A method of providing relevant search information comprises receiving a search term. The method also comprises locating a first search result that matches the search term, wherein the first search result is associated with a first measure of reputation, locating a second search result that matches the search term, wherein the second search result is associated with a second measure of reputation, and preferentially presenting the first and the second search results based on the first and the second measures of reputation.

25 Claims, 4 Drawing Sheets

REPUTATION BASED SEARCH

FIELD OF THE INVENTION

The present invention relates generally to search techniques. More specifically, a system and method of reputation based search is disclosed.

BACKGROUND OF THE INVENTION

As computer networks and electronic data continue to grow, users are becoming increasingly dependent on search tools to find the desired result from a myriad of available information. The first generation of Internet search tools rely on META tags, which are created by publishers of a web page to include relevant keywords of the page. When a user query is received, pages with META tags that match the words in the query are identified and presented to the user. There are some issues associated with this approach. Some page publishers, hoping that their web pages will turn up in searches, include many keywords unrelated to the content of the page in META tags. As a result, irrelevant pages often turn up in the search results, making the search results less useful. Furthermore, it is difficult to rank pages with matching META tags.

The second generation of search tools address some of the problems associated with the first generation search tools. The second generation solutions do not strictly rely on META tags. Instead, they match the user query with words in the page. Alternative ways of assessing page ranking are used, such as determining the number of times a page is referenced by other pages. However, these tools face similar challenges as the first generation search tools. Some publishers have learned ways to defeat the search algorithms to make their pages appear in searches by adding irrelevant words in the page, cross linking pages, etc. Furthermore, users conducting the search typically need to enter accurate search terms that match words in the page.

It would be desirable to have a way to provide relevant search results that are not easily defeated by publishers' manipulation of pages. It would also be useful if the search technique can easily rank the relevant pages, including ones that do not have the exact keywords as the user query.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing search information is disclosed. Upon receiving a search term, the system locates search results that match the search term and preferentially presents the search results according to measures of reputation associated with the search results. In some embodiments, the search results are initially submitted by authors who are users of the system. As used herein, reputation measures the usefulness of a search result in response to the search term. In some embodiments, reputation of a search result depends on the reputation of the author that submitted it, as well as other factors such as past relevancy of the search result based on user feedback.

Figure 1:
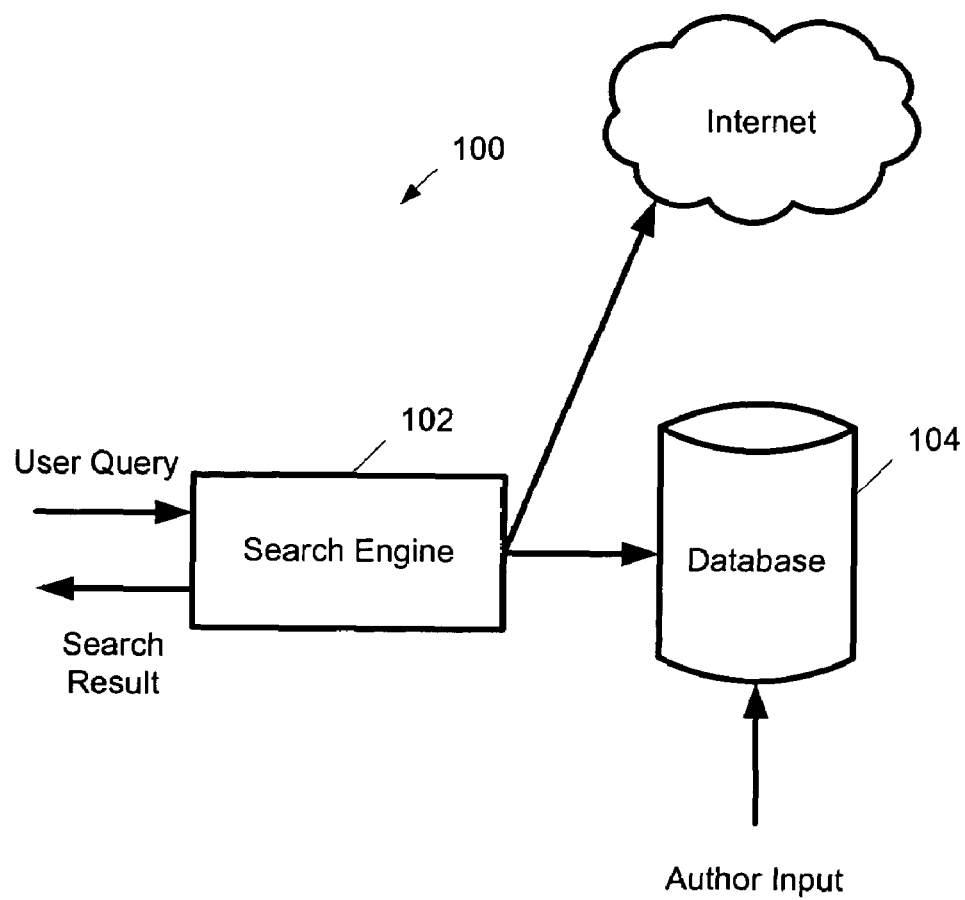
FIG. 1 is system diagram illustrating a search system embodiment.

FIG. 1 is system diagram illustrating a search system embodiment. In this example, system 100 includes a search engine 102 and a database 104. Search engine 102 receives a user query that includes a search term (e.g. a word or phrase such as "wedding photographer", "wedding AND photography") used to locate search results in database 104. Search results that match the search term are presents to the user. As used herein, a search result includes a data structure returned in response to the search query. It may include reference to resources such as a universal resource locator (URL), some other kind of link to a document, a title of the document, a keyword list, or other appropriate information. In some embodiments, if no matching search result is found in database 104, search engine 102 optionally redirects the user query to a general purpose search engine on the Internet to obtain results.

In the example shown, database 104 is populated by users of the system. Users who associate search results with search terms and enter the associations in database 104 are referred to as authors. The database implementation may vary for different embodiments. For purposes of illustration, databases that store the search results and use keywords in the search term for looking up the search results are discussed in detail throughout this specification. The techniques are equally applicable to other databases, such as ones in which the entries are encrypted, compressed or otherwise processed. Additional processing steps may be used as appropriate.

In some embodiments, each combination of a search result and a search term has a measure of reputation that depends on factors such as the reputation of the author and the past relevancy of the search result. Users in the system can provide feedback, which is used to adjust the reputations of search results and authors over time. User queries and feedbacks can be provided via a single interface or separately.

Figure 2:
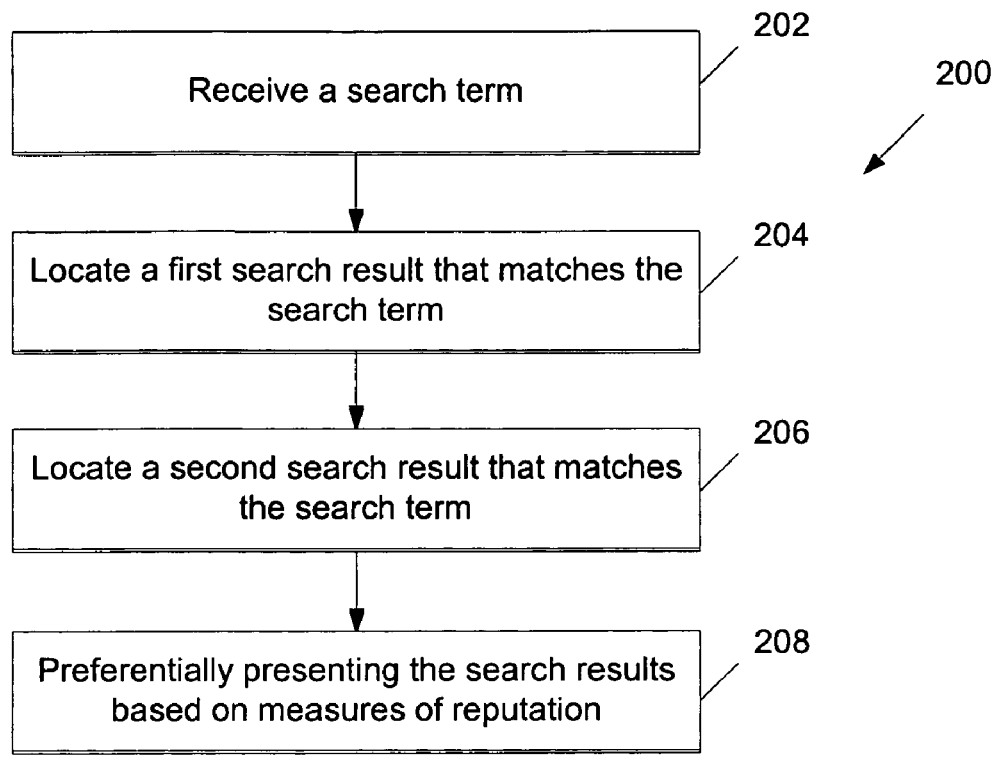
FIG. 2 is flowchart illustrating an example process of providing search results.

FIG. 2 is flowchart illustrating an example process of providing search results. In this example, process 200 starts when the search engine receives a search term from the user (202).

A first search result that matches the search term is located in the database (204). Various matching algorithms are used in different embodiments. For example, a search result is found to match the search term if all the words in the search term appear in the keyword list of the search result. In some embodiments, the database stores its entries in an encrypted and/or compressed form, therefore appropriate processing steps such as encryption, compression, hashing, etc. are applied to the received search term to find a match. A second search result that matches the search term is then located in the database (206). More search results, if available, are also located. Each search term/search result pair has an associated reputation, which measures the relevancy of the search result with respect to the search term. The matching search results are preferentially presented to the user, ordered according to their reputations (208). In some embodiments, a search result has the same reputation for every search term that matches the search result. In some embodiments, a search result has a different reputation for different search terms.

Figures 3A, 3B:
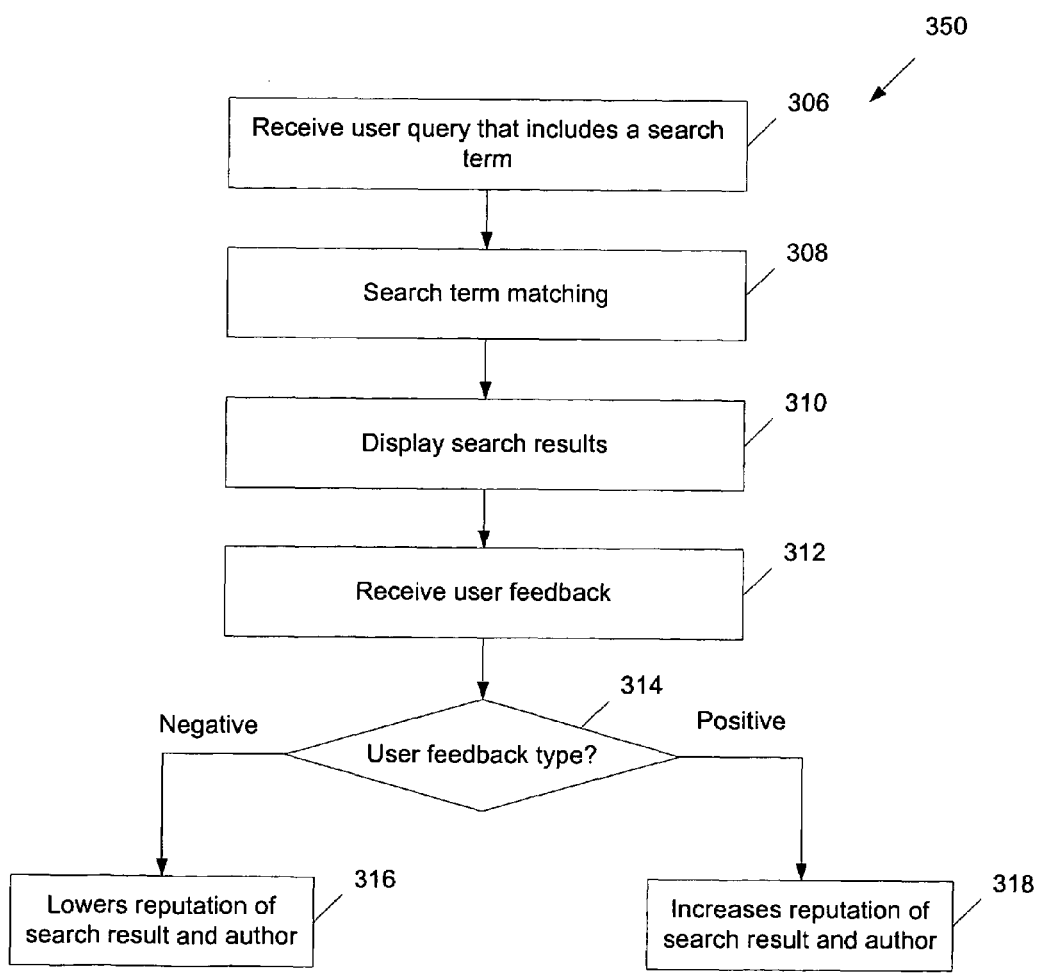
FIGS. 3A and 3B illustrate the processes for determining and changing the reputation.

The reputation of a search result changes over time as other users make queries and evaluate the search results returned in response to their queries. FIGS. 3A and 3B illustrate the processes for determining and changing the reputation. FIG. 3A is a flowchart illustrating the initial calculation of search result reputation according to some embodiments. At the beginning of process 300, a search result and its associated search term is submitted by an author (302). In some embodiments, the author has an author reputation, which, as will be described more fully below, is acquired over time based on feedback from other users and reflects the quality and relevance of the author's past submissions. The reputation of the search result is computed initially using the author reputation (303). The search term, search result and the corresponding reputation are then added to the database (304).

Process 300 is repeated as the system continuously receives author submissions. Sometimes different search terms are associated with the same resource. For example, "wedding photographer" and "photo journalism" may both reference a web page of a photographer who provides wedding photography service in photo journalistic style. As will be discussed in more detail below, the reputations of the search results may take on different values because of differences in reputations of the authors making the association.

Over time, as the search results are presented in response to user queries, users can provide feedback on the relevancy of each search result. FIG. 3B is a flowchart illustrating a user feedback process according to some embodiments. Process 350 initiates when a user query is received (306). The search term is extracted and used to locate a match in the database (308). Matching search results are presented preferentially according to their reputations (310). The display interface gives the user the option to provide different types of feedback, which is used later for adjusting reputation (312). If the user feedback is positive, i.e. the user finds that the search result is a relevant one in response to his search, the reputations of both the search result and the author are increased (316). If, however, the user provides negative feedback indicating that the search result is irrelevant, then both reputations are lowered (318).

Figure 4:
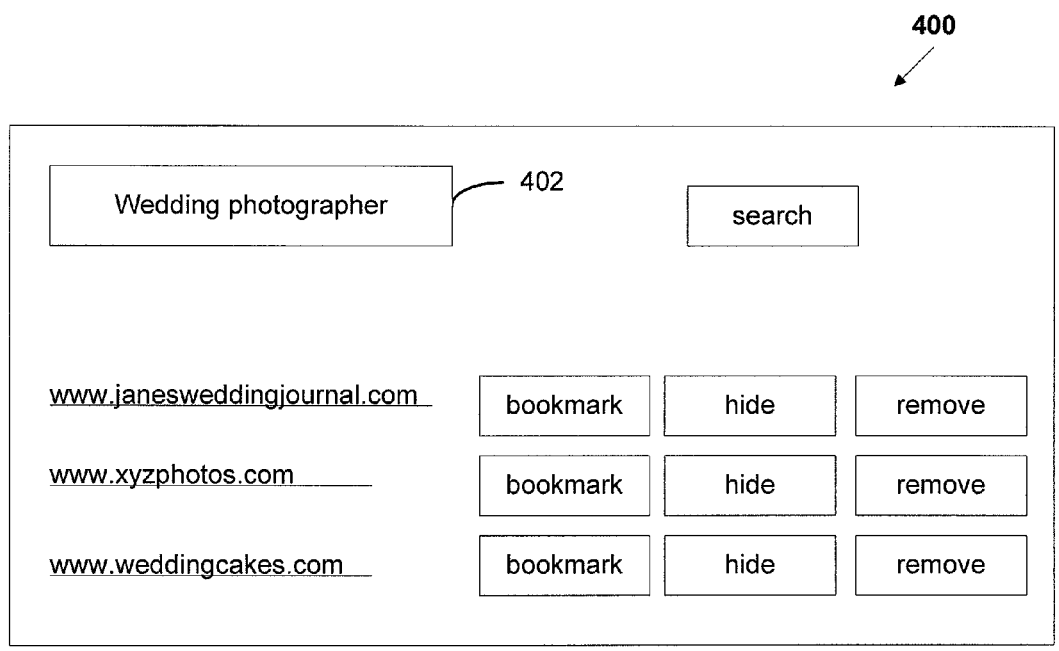
FIG. 4 is a diagram illustrating a user interface used to display search results and provide user feedback, according to one embodiment.

FIG. 4 is a diagram illustrating a user interface used to display search results and provide user feedback, according to one embodiment. In the example shown, a user query (in this case, "wedding photographer") is entered in query box 402 of user interface 400. The search results displayed include several URLs. The user is given the option to bookmark, hide, remove, or mark each search result as spam. For example, the user may bookmark a URL to a web page that offers useful information on how to select wedding photographers, hide a URL to a general purpose photography web site, remove a URL to a web site about wedding cakes, and mark a URL to a web site about get-rich-quick schemes as spam.

Saving a search result in a bookmark for future use indicates that the user finds the search result to be a useful and relevant one, thus the action is construed as a positive feedback that enhances the reputations of both the search result and the author. Hiding the search result indicates that the user does not want to see this search result in the future because he does not find it to be very useful; however, the author of the search result does not appear to have intentionally misrepresented the association between the search term and the search result. Removing the search result indicates that the user has found the association to be misleading and should be prevented from being shown in response to the search term in the future. Marking a result as spam is the highest form of negative feedback in the example shown. Other embodiments offer different user feedback options; some provide the user with greater granularity in rating the relevancy of a search result. The amount of change in reputation depends on the type of action and can vary for different implementations.

In one example, the reputation of a search result is calculated based on the following:

$$Rr = Ra*(C1*Nb + C2*Nh + C3*Nr + C4*Ns),$$

where Rr is the reputation of the search result, Ra is the reputation of the author, Nb, Nh, Nr, and Ns correspond respectively to number of times the search result has been bookmarked, hidden, removed, or marked as spam, and C1, C2, C3, and C4 are preset coefficients. Ra is computed according to the following:

$$Ra = D1*Tb + D2*Th + D3*Tr + D4*Ts,$$

where Tb, Th, Tr, and Ts correspond respectively to the total number of times search results submitted by this author has been bookmarked, hidden, removed, or marked as spam. There are other ways of computing the reputation based on search history that are used in different embodiments. In some embodiments, a user's impact on the reputation system depends on his own reputation, so that only users with a good reputation can influence other users. In some embodiments, only a prescribed set of users can be authors. In some embodiments, the privilege of submitting search results is revoked if an author's reputation falls below a prescribed level.

Since an author's reputation has a significant effect on the reputation of each search result he submits, authors have strong incentives to post high quality, accurate information. If an author posts entries that are misleading or attempts to spam the database, users will consistently hide or delete the entries or mark them as spam. As a result, the author's reputation will decline, as will the reputation of the entries submitted by the author. Consequently, it is less likely that the author's submissions will be seen by other users. Conversely, if an author posts useful, accurate information, then users will bookmark his results, causing his reputation to go up and his submissions to be featured more prominently. The reputation system essentially provides the checks and balances to ensure a properly functioning marketplace for search results.

Providing search results has been disclosed. Allowing authors to provide search results and using reputation based on user feedback to present the search results greatly improves relevancy of the search results.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing relevant search information comprising:
receiving a search term; locating a first search result that matches the search term, wherein the first search result is associated with a first measure of reputation;
locating a second search result that matches the search term, wherein the second search result is associated with a second measure of reputation;
preferentially presenting the first and the second search results based on the first and the second measures of reputation; and
receiving positive user feedback with respect to the first measure of reputation, wherein the positive user feedback indicates that a user has bookmarked the first search results, and
improving the first measure of reputation through use of an equation that includes a determined number of times that the first search result has been bookmarked.

2. A method as recited in claim 1, wherein the first measure of reputation depends on past relevancy of the first search result.

3. A method as recited in claim 1, wherein the search result includes a reference to a resource.

4. A method as recited in claim 1, wherein the association of the first search result with the search term is made by an author.

5. A method as recited in claim 4, wherein the first measure of reputation is based at least in part on an author reputation associated with the author.

6. A method as recited in claim 5, further comprising receiving user feedback with respect to the first measure of reputation and modifying the author reputation.

7. A method as recited in claim 1, wherein the first and the second search results are associated with the same resource.

8. A method as recited in claim 1, wherein the first search result and the second search result are associated with the same resource, and the first measure of reputation is different from the second measure of reputation.

9. A method as recited in claim 1, wherein preferentially presenting the first and the second search results include sorting the first and the second search results according to the first and the second measures of reputation.

10. A method as recited in claim 1, further comprising receiving user feedback with respect to the first measure of reputation.

11. A method as recited in claim 1, further comprising receiving user feedback with respect to the first measure of reputation and modifying the first measure of reputation.

12. A method as recited in claim 1, further comprising receiving positive user feedback with respect to the first measure of reputation and improving the first measure of reputation.

13. A method as recited in claim 1, further comprising receiving negative user feedback with respect to the first measure of reputation and reducing the first measure of reputation.

14. A method as recited in claim 13, wherein the negative user feedback indicates a user has hidden the first search result.

15. A method as recited in claim 13, wherein the negative user feedback indicates a user has removed the first search result.

16. A method as recited in claim 13, wherein the negative user feedback indicates a user has marked the first search result as spam.

17. A system configured to provide relevant search information comprising:

a processor configured to:
receive a search term;
locate a first search result that matches the search term, wherein the first search result is associated with a first measure of reputation;
locate a second search result that matches the search term, wherein the second search result is associated with a second measure of reputation;
preferentially present the first and the second search results based on the first and the second measures of reputation; and
receive positive user feedback with respect to the first measure of reputation, wherein the positive user feedback indicates that a user has bookmarked the first search results, and
improve the first measure of reputation using an equation that includes a determined number of times that the first search result has been bookmarked; and
a memory coupled to the processor, configured to provide the processor with instructions.

18. A system as recited in claim 17, wherein the processor is further configured to receive the association of the first search result with the search term, the association being made by an author.

19. A system as recited in claim 17, wherein the processor is further configured to receive user feedback with respect to the first measure of reputation and to modify the first measure of reputation.

20. A system as recited in claim 17, wherein the processor is further configured to receive negative user feedback with respect to the first measure of reputation and reduce the first measure of reputation.

21. A computer program product for providing relevant search information, the computer program product being embodied in a computer readable storage medium and comprising computer instructions for:
receiving a search term; locating a first search result that matches the search term, wherein the first search result is associated with a first measure of reputation;
locating a second search result that matches the search term, wherein the second search result is associated with a second measure of reputation;
preferentially presenting the first and the second search results based on the first and the second measures of reputation; and
receiving positive user feedback with respect to the first measure of reputation, wherein the positive user feedback indicates that a user has bookmarked the first search results, and
improving the first measure of reputation through use of an equation that includes a determined number of times that the first search result has been bookmarked.

22. A computer program product as recited in claim 21, wherein the association of the first search result with the search term is made by an author.

23. A computer program product as recited in claim 21, further comprising receiving user feedback with respect to the first measure of reputation.

24. A computer program product as recited in claim 21, further comprising receiving user feedback with respect to the first measure of reputation and modifying the first measure of reputation.

25. A computer program product as recited in claim 21, further comprising receiving negative user feedback with respect to the first measure of reputation and reducing the first measure of reputation.

* * * * *